United States Patent
Loureiro et al.

(10) Patent No.: US 10,412,109 B2
(45) Date of Patent: Sep. 10, 2019

(54) METHOD FOR DETECTING VULNERABILITIES IN A VIRTUAL PRODUCTION SERVER OF A VIRTUAL OR CLOUD COMPUTER SYSTEM

(71) Applicant: OUTPOST 24 FRANCE, Valbonne (FR)

(72) Inventors: Sergio Loureiro, Mouans Sartoux (FR); Frédéric Donnat, Valbonne (FR)

(73) Assignee: OUTPOST 24 FRANCE, Valbonne (FR)

(*) Notice: Subject to any disclaimer, the term of this patent is extended or adjusted under 35 U.S.C. 154(b) by 206 days.

(21) Appl. No.: 15/291,776

(22) Filed: Oct. 12, 2016

(65) Prior Publication Data
US 2017/0111384 A1    Apr. 20, 2017

(30) Foreign Application Priority Data

Oct. 16, 2015    (FR) ..................... 15 02184

(51) Int. Cl.
*H04L 29/06*    (2006.01)
*G06F 21/57*    (2013.01)
*G06F 9/455*    (2018.01)

(52) U.S. Cl.
CPC ........ *H04L 63/1433* (2013.01); *G06F 21/577* (2013.01); *H04L 63/1408* (2013.01); *H04L 63/1441* (2013.01); *G06F 2009/45587* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 8,302,191 B1 * | 10/2012 | Conrad | .................. | G06F 21/56 726/22 |
| 8,904,525 B1 * | 12/2014 | Hodgman | .............. | G06F 21/562 726/22 |
| 8,924,700 B1 | 12/2014 | Karmarkar et al. | | |
| 9,419,193 B2 * | 8/2016 | Barchmann | ............. | H01L 24/82 |
| 9,594,912 B1 * | 3/2017 | Thioux | ................. | G06F 21/577 |

(Continued)

FOREIGN PATENT DOCUMENTS

EP    2 237 181 B2    10/2010

OTHER PUBLICATIONS

French Search Report and Written Opinion dated Sep. 13, 2015 issued in counterpart application No. FR1502184; w/ English partial translation and partial machine translation (13 pages).

*Primary Examiner* — Andrew J Steinle
(74) *Attorney, Agent, or Firm* — Westman, Hattori, Daniels & Adrian, LLP

(57) ABSTRACT

The method for detecting vulnerabilities in a virtual production server of a virtual or cloud computer system of one or more virtual servers includes analyzing vulnerabilities in the virtual production servers by connecting to the virtual or cloud computer system; requesting the cloning of the virtual production server in order to obtain a clone or a disk copy of the virtual production server, which is created in the virtual or cloud computer system; connecting to the clone or to the disk copy; analyzing the vulnerabilities of the clone or of the disk copy; erasing the clone or the disk copy; and generating a report analyzing the vulnerabilities of the clone or of the disk copy.

20 Claims, 3 Drawing Sheets

(56) References Cited

U.S. PATENT DOCUMENTS

| | | | |
|---|---|---|---|
| 2010/0251004 A1 | 9/2010 | Schuba et al. | |
| 2012/0089828 A1* | 4/2012 | Jain | H04L 63/029 |
| | | | 713/151 |
| 2012/0117383 A1* | 5/2012 | Kim | G06F 8/63 |
| | | | 713/165 |
| 2013/0333042 A1* | 12/2013 | Saika | G06F 11/1469 |
| | | | 726/24 |
| 2015/0026813 A1* | 1/2015 | Wang | H04L 63/1408 |
| | | | 726/25 |
| 2016/0188885 A1* | 6/2016 | Lee | G06F 21/577 |
| | | | 726/25 |

* cited by examiner

METHOD FOR DETECTING VULNERABILITIES IN A VIRTUAL PRODUCTION SERVER OF A VIRTUAL OR CLOUD COMPUTER SYSTEM

FIELD OF THE INVENTION

The present invention relates to a method for detecting vulnerabilities in a virtual production server of a virtual or cloud computer system comprising one or more virtual servers.

PRIOR ART

The security of computer systems, and in particular the security of virtual or cloud computer systems, is addressed through a number of tools, including the detection of vulnerabilities.

The detection of vulnerabilities in a virtual or cloud computer system involves testing the system against known flaws. In practice, these flaws are regularly discovered by researchers in the field of computer security or by software publishers themselves. They are listed in public databases such as the CVE (Common Vulnerabilities and Exposures) database, maintained by an organization called MITRE™.

Conventionally, searches for vulnerabilities involve scanning the networks to find the open ports of the production servers, then identifying the programs installed on these servers and comparing to the database of vulnerabilities. Alternatively, the same function can be implemented via a software agent that is installed on the production server and carries out the comparison directly on the server.

Such searches for vulnerabilities, however, have various disadvantages.

First of all, the detection of the operating systems is generally difficult because they are hidden by the network layers of the hypervisors.

In addition, the performance and the availability of the production servers (and of their applications) are affected by the searches for vulnerabilities. Indeed, these searches use up significant resources on the servers. Thus, in the prior art, the searches for vulnerabilities are not automated in the sense that they are launched through human intervention. Moreover, the searches for vulnerabilities are not carried out frequently, for example every day. New vulnerabilities, however, are identified every day, and thus production servers carry potential risks in the period of time that passes between two searches for vulnerabilities.

Furthermore, deep searches for vulnerabilities often require administrator rights over the production server, for example when an agent is installed on the production server. However, the owners of the data on the production servers do not wish to communicate the administrator keys of the production servers to third parties, even when this is for searches for vulnerabilities, which are essential for securing their data.

Finally, certain searches for vulnerabilities may cause damage to the production servers. For this reason, the auditor of the production servers, who carries out the searches, avoids carrying out intrusive tests on the servers, for example tests involving an SQL (Structure Query Language) injection or an injection of Cross Site Scripting or XSS with a dump of the entire database, since this dump can affect the performance of the server or even cause a stoppage. Thus, in the prior art, the searches for vulnerabilities are searches that involve tests that do not pose any risk to the servers, but these searches are not exhaustive, are not frequent, and often lead to the identification of false positives.

SUMMARY OF THE INVENTION

Given that which has been stated above, the invention relates to a method for detecting vulnerabilities in a virtual production server of a virtual or cloud computer system, said method overcoming the aforementioned disadvantages of the prior art, for less costs.

The first object of the proposed solution of the invention is a method for detecting vulnerabilities in a virtual production server of a virtual or cloud computer system, said system comprising one or more virtual servers, characterized in that said method comprises the following steps:

a system for analyzing vulnerabilities in the virtual production server or servers is provided;

the system for analyzing vulnerabilities connects to the virtual or cloud computer system;

the system for analyzing vulnerabilities requests the cloning of the virtual production server in order to obtain a clone or a disk copy of the virtual production server;

the clone or the disk copy is created in the virtual or cloud computer system;

the system for analyzing vulnerabilities connects to the clone or to the disk copy;

the system for analyzing vulnerabilities analyzes the vulnerabilities of the clone or of the disk copy;

the clone or the disk copy is erased;

a report analyzing the vulnerabilities of the clone or of the disk copy is generated;

the vulnerabilities in the virtual production server are deduced from the analysis of the vulnerabilities of the clone or of the disk copy;

the report analyzing the vulnerabilities is used to fix the vulnerabilities of the virtual production server.

Advantageously:—the system for analyzing vulnerabilities uses cloning functions present in the virtual or cloud computer system to clone the virtual production server;—the cloning functions present in the virtual or cloud computer system comprise a hypervisor and an infrastructure of programming interfaces;—the analysis system comprises a scanner and a database of data relative to the vulnerabilities and/or to the scripts of tests of the servers and/or to the security policies and/or to the histories of the analyses carried out;—for the connection, the IP address and/or the identifier of the server, as well as a key that allows the server to be cloned or at least a disk copy of the virtual disk or disks of said server to be made, are provided to the analysis system, then the system generates at least one key for the administration of the clone or for the attachment of the disk copy;—the connection is carried out with or without authentication, via a secure tunnel or scripts copied onto the clone;—the clone or the disk copy is placed in an isolated zone of the cloud computer system; and—the vulnerabilities analyzed include the analysis of at least one of the following vulnerabilities: presence of viruses, presence of malware, hacking of the server, presence of non-integrated data, presence of logs, presence of intrusions, flaw in the following of security policies, analysis of the existence of intelligent fraud, flaw in the code, presence of changes in trend in the servers;—sniffer software is placed on the clone;—the method further comprises a step in which corrections of vulnerabilities are carried out in the clone;—when a disk copy is made, viruses or malware on this disk copy are not being executed; and—in order to be implemented, it does not require the administrator keys for the production server.

The second object of the proposed solution is a system for analyzing vulnerabilities in a virtual production server of a virtual or cloud computer system, for the implementation of the aforementioned method.

BRIEF DESCRIPTION OF THE DRAWINGS

The invention will be better understood after reading the non-limiting description that follows, drafted in view of the drawings, in which.

DETAILED DESCRIPTION OF THE INVENTION

The invention relates to a method for detecting vulnerabilities in a virtual production server of a virtual or cloud computer system.

A virtual or cloud computer system is a set of hardware, network connections and software that provide sophisticated services that can be used as much as desired from any location in the world via the Internet. The essential features of a virtual or cloud computer system are worldwide self-service availability, elasticity, openness, pooling, and pay-per-use. In particular, the resources are self-service and automatically adapted to the demand. The storage capacity and the computing power are automatically adapted to the needs of a consumer. The services are pooled. Heterogeneous resources (hardware, software, network traffic) can be combined in order to serve multiple consumers, to whom the resources are automatically allocated. Pooling improves scalability and elasticity and allows the resources to be automatically adapted to the variations in demand. Payment is per use: the quantity of services used in the system is measured and has an impact on billing. A virtual computer system is a computer system that comprises a hypervisor and at least one virtual machine for the virtualization of this system. The virtual or cloud computer system can comprise a plurality of virtual or cloud computer subsystems, for example a plurality of clouds, in certain cases clouds managed by different operators.

Figure 1:
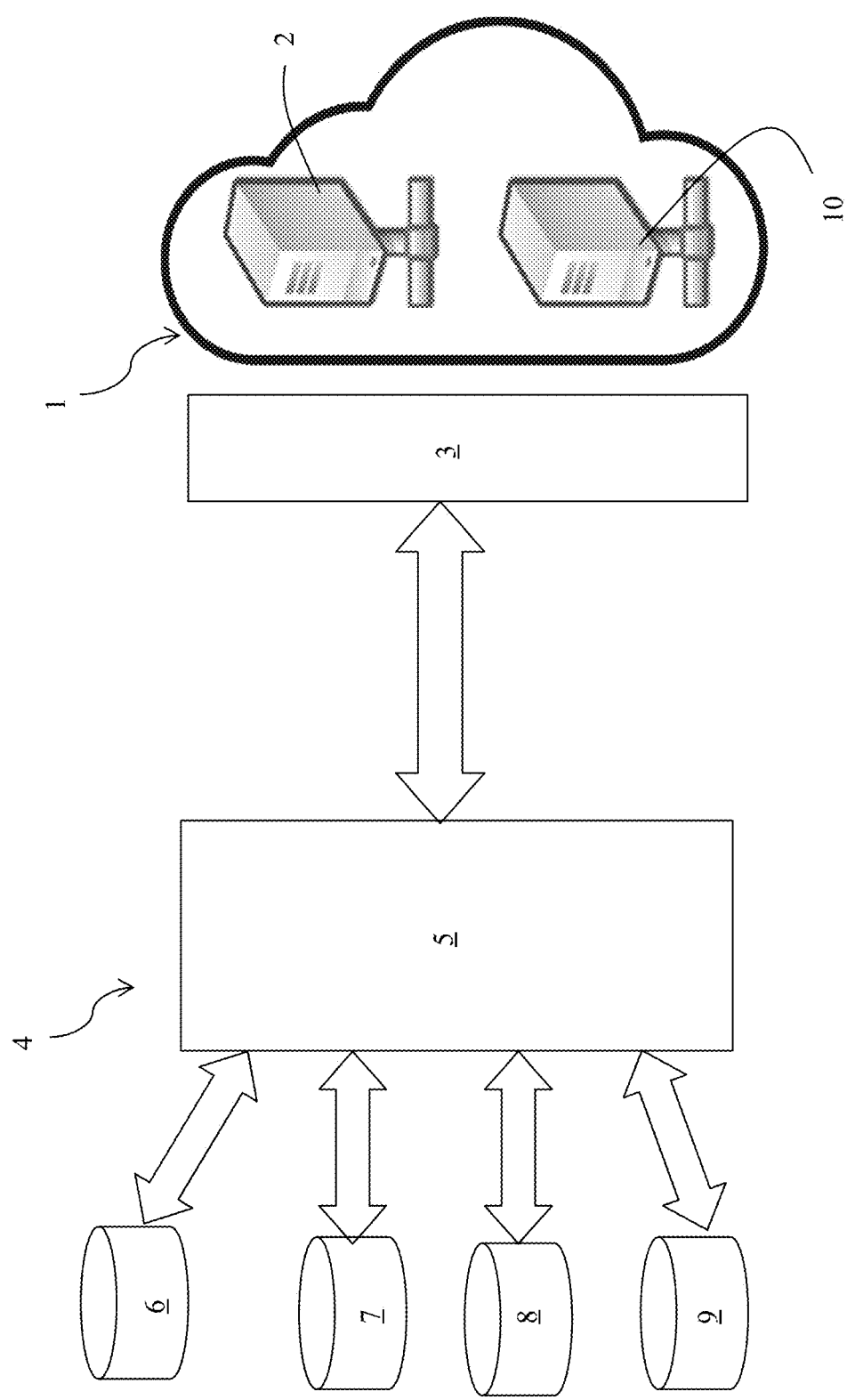
FIG. 1 is a diagram representing the means for implementing the method according to the invention.
Figure 2:
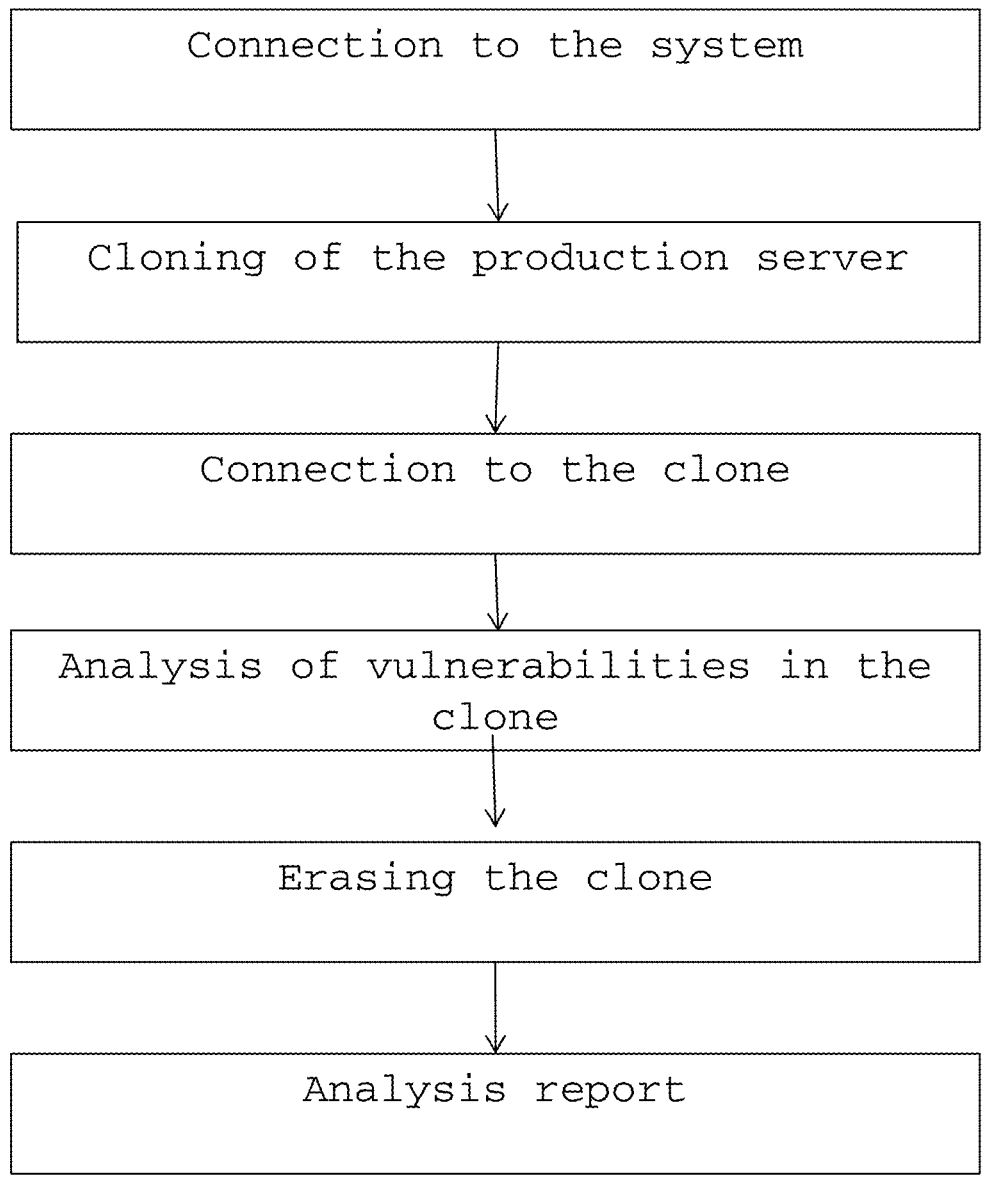
FIG. 2 represents various steps of the method according to the invention.

A cloud computer system is shown in FIG. 1 under reference 1. It comprises a plurality of virtual production servers 2. Virtual production servers are servers that are accessible to their users for the execution of applications, as opposed to development servers, on which applications are developed. The architecture of these servers has three tiers or three levels. Each virtual production server 2 is identified in the system by at least one server identifier. Moreover, each virtual production server 2 is associated with one or more virtual memory disks. One or more physical memory disks correspond to each virtual memory disk. These physical disks are not shown in the drawings. They are, however, part of the physical layer of the system, as opposed to the virtual instances, which are part of the virtualization layer. The virtualization that is used in cloud systems thus involves creating a software layer that disregards the hardware layer containing the physical servers. For example, a real central processing unit (CPU) with four cores can be transformed into four servers with one CPU in the simplest case, or a virtual server can be designed to use 20% of a CPU, and the remaining 80% can be used by another virtual server. The memory and the disk can also be shared between various virtual servers.

The cloud computer system 1 comprises an infrastructure of programming interfaces (APIs) 3 that in particular allows the virtual production servers 2 to be created and managed in the system 1.

According to the invention, a system 4 for analyzing vulnerabilities in the virtual production servers 2 is provided.

Such an analysis system 4 comprises a scanner 5 and a database of data relative to the vulnerabilities 6, to the scripts of tests 7 of the servers 2, to the security policies 8, and to the histories 9 of the analyses carried out. The database relative to the vulnerabilities is constructed via public databases, technological monitoring and data taken from online hacking forums (threat intelligence). The test scripts 7 allow the vulnerabilities to be tested and exploited. Such exploitation involves continuing the tests up to the limits of resistance of the server, which cannot be carried out on servers in production because of the associated risks. The security policies 8 allow the servers and the tests to be carried out to be classified according to how critical they are, the network and connection zone, and the threats. For example, said policies define the depth and the frequency of the tests. The histories of the analyses carried out are a history of all the tests carried out. In particular, such a history is used to analyze the trends in the security indicators, for example the number of vulnerabilities.

This system 4 is a system that is outside of the virtual or cloud computer system and has the following rights of listing the virtual servers in the cloud computer system, listing the network topology for duplication, and cloning or making a disk copy.

For the search for vulnerabilities in a production server 2 in a virtual or cloud computer system 1, the owner of the server 2 must provide the system 4 with the IP address and/or the identifier of this server and a key that allows the server 2 to be cloned or at least a disk copy of the virtual disk or disks of said server to be made. The owner does not have to provide the administrator key for this server 2. In order to provide this key that allows cloning (or the disk copy), the owner creates a key having cloning (or disk copy) rights. This key is entered into the analysis system 4 according to the invention. This system 4 then generates at least one key, but in practice a public/private pair of keys, for the administration of the clone. This procedure is carried out for each search for vulnerabilities in a server 2, or once for all the searches in the same server 2.

According to the invention, the system 4 for analyzing vulnerabilities connects to the cloud computer system 1.

Then, once the connection has been made, the analysis system 4 uses an API, present in the system 1, that allows the server 2 to be cloned via the specific key comprising cloning (or disk copy) rights with which the analysis system 4 was provided. The key is provided to the cloud computer system and this system then creates a clone (or disk copy) of the virtual server 2. This clone is denoted by reference sign 10 in FIG. 1. In practice, the cloning is carried out via the functions of the hypervisor, of the APIs of the cloud computer system, or of the container management system, using the cloning functions present in the virtualization systems such as Vmware™, vSphere™ and Microsoft Hyper V™, in the cloud infrastructures such as Amazon Web Services™ and Openstack™, and in the container systems such as Docker™ and Kubernetes™.

It should be noted that all the levels (or tiers) of the virtual production servers are cloned or are the object of a disk copy, which in most cases represents a significant quantity of data, for example at least several hundred gigabytes, or even terabytes of data.

It should be noted that the clone or the disk copy may be clones or disk copies not of the original virtual production server, but of the backup virtual production server, or of copies of this original virtual production server.

The clone 10 is advantageously placed in a network zone isolated from the cloud computer system 1 in such a way as to avoid the side effects that could be caused by running the tests of searching for vulnerabilities. If the virtual or cloud computer system comprises a plurality of subsystems, for example a plurality of clouds, the disk copy or the clone can be placed in a different subsystem than the system containing the virtual production server, for example a subsystem forming a different cloud and managed by a different operator than the system containing the virtual production server for which a detection of vulnerabilities is desired. The clone or the disk copy is not made in the system for analyzing vulnerabilities, which remains outside of the virtual or cloud computer system.

It should be noted that making the disk copies or clones does not normally have a performance impact on the servers of the system 1. This is beneficial to the redundancy mechanisms that are in place with these solutions, with copies for high availability. According to the invention, immediate access is given to a redundant copy and in order to make new copies, without affecting performance. However, it is possible to schedule the creation of the disk copies or clones in such a way that this creation is carried out outside of periods of high demand for services in the cloud systems, for example outside of working hours in the United States if the cloud system is based in United States territory.

In a subsequent step of the method according to the invention, the system for analyzing vulnerabilities connects to the clone 10 of the virtual server 2. This connection is made with the new authentication data managed by the software, which is different than the data of the production machines. This connection is made via the private key previously generated by the analysis system 4 for the administration of the clone 10.

Figure 3A:
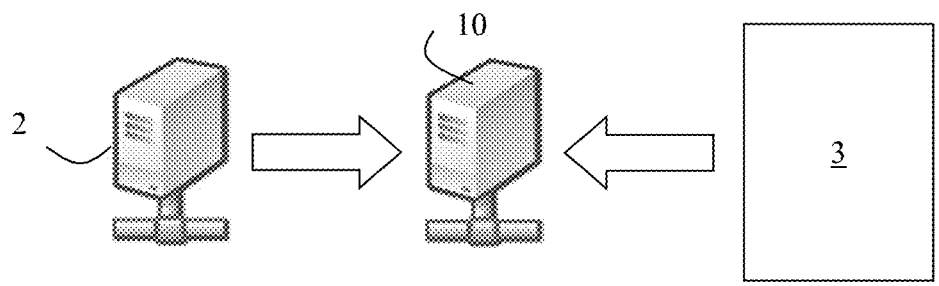
FIGS. 3A, 3B, 3C and 3D represent various modes of connecting the analysis system to the clone or to the disk image for the implementation of the method according to the invention.
Figure 3B:
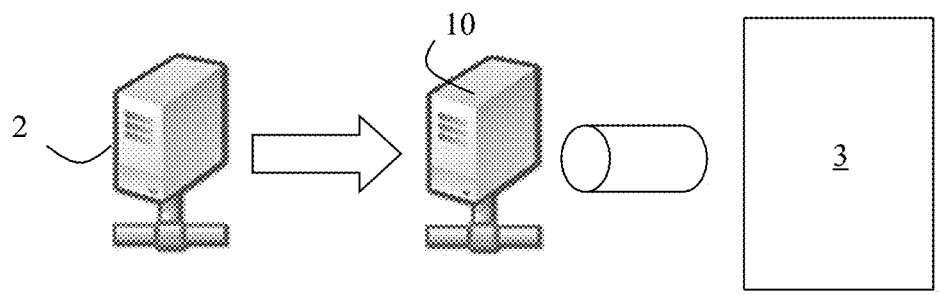
Figure 3C:
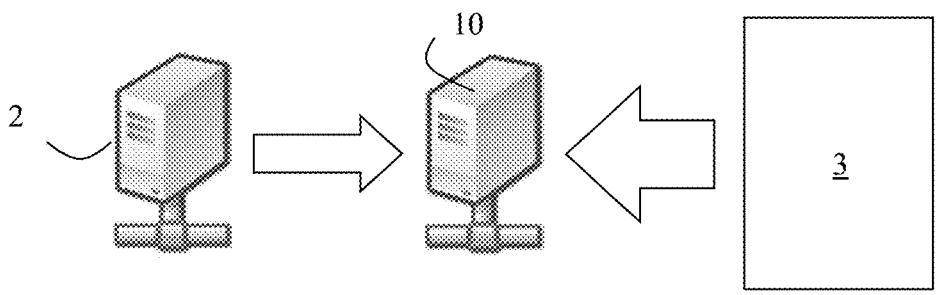
Figure 3D:
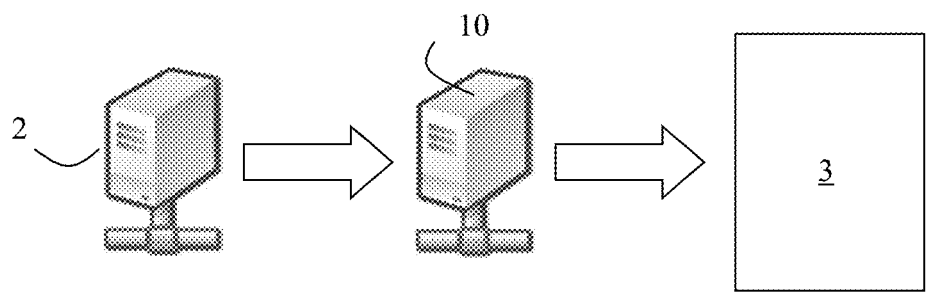

In practice, this connection can be made without authentication via a network scanner, for example such as Nmap™, or with authentication using the protocols Telnet™ or RDP (Remote Desktop)—see FIG. 3A. Moreover, the connection can be made via an SSH or VPN (Virtual Private Network) secure tunnel—see FIG. 3B—or via scripts copied onto the clone—see FIG. 3C. When a disk image is created, the operation carried out is then an operation of attaching a disk—see FIG. 3D.

The system 4 for analyzing vulnerabilities then analyzes the vulnerabilities of the clone 10. For this purpose, it uses the data contained in the databases of data relative to the vulnerabilities 6, scripts of tests contained in the database of scripts of tests 7, and the security policies contained in the database of security policies 8, and has access to the histories of the analyses previously carried out, in particular for clones of the server 2.

The analysis involves carrying out tests and verifying files on the clone 10. There are multiple tests. They are carried out with: conventional scanners such as Nessus™ and OpenVAS™, software elements that verify that the configuration files follow good practice, software for exploiting flaws such as Metasploit™. They involve an analysis of log files, the verification of the cryptographic checksums to detect modifications, a check for the presence of malware or viruses. All the tests can be carried out since they are carried out on a clone and not on a production machine, in particular the intrusive tests such as Metasploit™, which can affect the performance and the availability of the servers and of the applications said servers contain. Moreover, in the case of APTs (Advanced Persistent Threats), the analyses involve the detection of weak signals that are abnormal when compared to the history. This analysis does not need to be carried out in real time, and can be carried out at regular intervals with a clone and thus save resources. Instead of carrying out the analyses in real time when the logs arrive, the analysis system lets the logs accumulate in the production server or in a remote server.

Optionally, a program called a sniffer, such as the software distributed under the names tcpdump™ or wireshark™, can be placed in the clone in order to analyze all the incoming and outgoing connections. The operation of such a sniffer program is dangerous on a production server and in general has a significant impact on the performance of this server. By doing this on the clone, the production server will not be affected. By doing this, a fine analysis of the communications is put in place, and it is possible to detect connections to IP addresses that are dangerous or on blacklists or greylists, for example command and controls (C&C), and determine the control centers of massive botnet attacks for example.

Optionally, corrections of the vulnerabilities identified are carried out on the clone 10. By doing this, it is possible to foresee the impact of the corrections on the production server and then decide whether the corrections can be implemented in the production server itself, and in what way. Optionally, after the corrections are applied to the clone 10, said clone can replace the production server.

In the case of a disk image, the server is not in execution mode. Thus, there is no need to obtain additional CPU (central processing unit) resources, and the analysis is therefore less costly (no costs related to the CPU) and more secure because if the virtual machine is infected or contains viruses/malware, these viruses or this malware are not being executed and the possible counter-measures are not implemented.

When the tests are completed, the clone 10 or the disk copy is erased.

Reports are created and dashboards are created with the state of the security of the virtual servers. These dashboards and tables are built with indicators of the security of the virtual servers and, more generally, of the cloud computer system (network, firewall, applications, data). It allows alerts to be generated when the analysis system identifies a critical vulnerability or an event that violates a security policy. The reports are generated with the history of the tests carried out, the results and the trends.

This process can be implemented as needed. It can also be repeated automatically with a frequency that can be configured, for example once per day, once per week or once per month. It is thus possible to continually monitor flaws with reduced costs.

The method according to the invention can advantageously replace the systems for detecting viruses, malware or networks of machines controlled by hackers; the systems for verifying the integrity of the data stored on the server; the systems for analyzing logs and SIEM (System Information and Event Management) systems; the systems for detecting intrusion; the systems for verifying that the security policies are applied; the systems for analyzing and processing the threats; the systems for analyzing code; the systems for detecting and analyzing the trends; and the systems for analyzing the changes made in the servers. According to the invention, an agent does not need to be installed on the server in order to carry out the aforementioned actions.

The invention claimed is:

1. A method for detecting vulnerabilities in at least a virtual production server of a first system corresponding to a virtual or cloud computer system, the method comprising:
providing a second system for analyzing vulnerabilities in the at least a virtual production server of the first system, said second system being outside of the first system;
connecting the second system to the first system;
requesting, by the second system, a cloning of the at least a virtual production server, so as to obtain a clone or a disk copy of the at least a virtual production server;
creating, by the second system, the clone or the disk copy in the first system;
connecting the second system to the clone or to the disk copy;
analyzing by the second system, the vulnerabilities of the clone or of the disk copy in the first system;
erasing, by the second system, the clone or the disk copy in the first system;
generating, by the second system, a report on the analyzing of the vulnerabilities of the clone or of the disk copy;
deducing, by the second system, the vulnerabilities in the at least a virtual production server from the analysis of the vulnerabilities of the clone or of the disk copy; and
using, by the second system, the report analyzing the vulnerabilities to fix the vulnerabilities of the virtual production server.

2. The method according to claim 1, wherein the second system uses cloning functions of application programming interfaces of the first system to clone the at least a virtual production server.

3. The method according to claim 1, wherein the second system uses cloning functions of a hypervisor of the first system to clone the at least a virtual production server, said hypervisor being controlled by the second system through an infrastructure of application programming interfaces.

4. The method according to claim 1, wherein the second system comprises a scanner and a database of data relative to the vulnerabilities and/or to the scripts of tests of the servers and/or to the security policies and/or to the histories of the analyses carried out.

5. The method according to claim 1, wherein, for the connection, the IP address and/or the identifier of the first server, as well as a key that allows the server to be cloned or at least a disk copy of the virtual disk or disks of said server to be made, are provided to the second system, then the second system generates at least one key for the administration of the clone or for the attachment of the disk copy.

6. The method according to claim 1, wherein the connection is carried out with or without authentication, via a secure tunnel or scripts copied onto the clone.

7. The method according to claim 1, wherein the clone or the disk copy is placed in an isolated zone of the first system.

8. The method according to claim 1, wherein the vulnerabilities analyzed include the analysis of at least one of the following vulnerabilities: presence of viruses, presence of malware, hacking of the server, presence of non-integrated data, presence of logs, presence of intrusions, flaw in the following of security policies, analysis of the existence of intelligent fraud, flaw in the code, presence of changes in trend in the servers.

9. The method according to claim 1, wherein sniffer software is placed on the clone.

10. The method according to claim 1, further comprising carrying out corrections of vulnerabilities in the clone.

11. The method according to claim 1, wherein, when a disk copy is made, viruses or malware on this disk copy are not being executed.

12. The method according to claim 1, wherein, in order to be implemented, said method does not require administrator keys for the at least a virtual production server.

13. A system for analyzing vulnerabilities in a virtual production server of a virtual or cloud computer system comprising one or more virtual servers, wherein the system for analyzing vulnerabilities in the virtual production server or servers comprises a memory associated with at least a processor configured to:
connect to the virtual or cloud computer system;
request the cloning of the virtual production server so as to obtain a clone or a disk copy of production server, the clone or the disk the virtual copy being created in the virtual or cloud computer system;
connect to the clone or the disk copy;
analyze the vulnerabilities of the clone or of the disk copy in the virtual or cloud computer system;
erase the clone or the disk copy in the virtual or cloud computer system;
generate a report on the analyzing of the vulnerabilities of the clone or of the disk copy, so as to deduce vulnerabilities in the virtual production server from an analysis of the vulnerabilities of the clone or of the disk copy.

14. The system according to claim 13, wherein said at least a processor is further configured to erase the clone or the disk copy, to generate the report analyzing the vulnerabilities of the clone or of the disk copy, and to deduce the vulnerabilities in the virtual production server from the analysis of the vulnerabilities of the clone or of the disk copy.

15. The system according to claim 13, wherein the system is configured to use cloning functions of application programming interfaces of the first system to clone the at least a virtual production server.

16. The system according to claim 13, wherein the system is configured to use cloning functions of a hypervisor of the first system to clone the at least a virtual production server, said hypervisor being controlled by the second system through an infrastructure of application programming interfaces.

17. The system according to claim 13, wherein the system comprises a scanner and a database of data relative to the vulnerabilities and/or to the scripts of tests of the servers and/or to the security policies and/or to the histories of the analyses carried out.

18. The system according to claim 13, wherein the system is configured so that, for the connection, the IP address and/or the identifier of the first server, as well as a key that allows the server to be cloned or at least a disk copy of the virtual disk or disks of said server to be made, are provided to the system, then the system generates at least one key for the administration of the clone or for the attachment of the disk copy.

19. The system according to claim 13, wherein the system is configured so that the connection is carried out with or without authentication, via a secure tunnel or scripts copied onto the clone.

20. The system according to claim 13, wherein the system is configured to place the clone or the disk copy in an isolated zone of the first system.

\* \* \* \* \*